Figure 1:
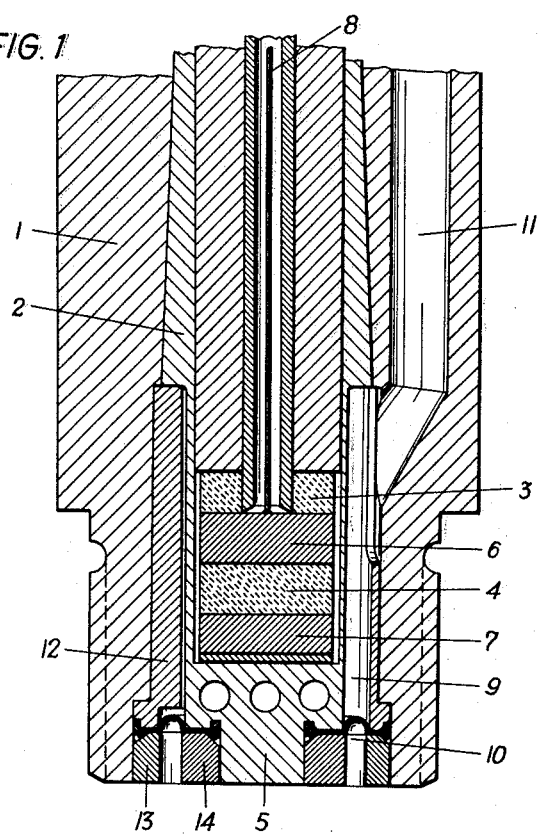

Nov. 24, 1964 S. BUSCH ETAL 3,158,763
PIEZOELECTRIC GAUGE
Filed Dec. 5, 1961

Inventors
Siegfried Büsch
Rudolf Hatschek
Franz Pischinger
By Watson, Cole, Grindle & Watson
Attys.

United States Patent Office 3,158,763
Patented Nov. 24, 1964

3,158,763
PIEZOELECTRIC GAUGE
Siegfried Busch, Graz, Rudolf Hatschek, Vienna, and
Franz Pischinger, Graz, Austria, assignors to Hans List,
Graz, Austria
Filed Dec. 5, 1961, Ser. No. 157,172
Claims priority, application Austria Jan. 2, 1961
5 Claims. (Cl. 310—8.7)

The invention relates to a piezoelectric gauge, in particular for measuring the pressure variations in the cylinders of internal combustion engines, comprising a casing wherein the piezoelements and a head transmitting pressure to the latter are located, an annular clearance closed by a membrane being provided between the casing and the head.

In order to ensure the permanent maintenance of the particular characteristics of the piezoelectric gauge it is essential for the annular clearance to be sealed in such manner that always a constant proportion of the pressure applied to the seal is transmitted to the head. In particular, the characteristics of force transmission shall not be altered by any relative motion between the casing and the head liable to occur as a result of different degrees of thermal expansion or of mechanical stress of parts, such as for example when screwing the gauge into the cylinder of an internal combustion engine when the threaded section of the casing is expanded. Sealing is required also for uncooled gauges since the piezoelements and/or the surrounding sensitive parts, such as for example a sleeve for prestressing the latter should not be subject to the pressure to be measured and the passage of gas through the gauge should possibly be avoided.

In conventional gauges a flat membrane is generally used for sealing, said membrane being of annular shape and attached to the casing and to the head by means of two coaxial rings. To ensure greater rigidity the membrane is of considerable thickness, the force required for the arching of the membrane as a result of a relative motion between the head and the casing being transferred to said head. However, this will not ensure constant characteristics for the gauge (ratio between the gas pressure in front of the gauge and the force applied to the piezoelements by the gas pressure), since the ratio of force transmission for a flat membrane of a certain thickness is altered by arching. This will be further emphasized by the fact that it is practically impossible either to produce ideally sharp edges at the seatings of the membrane or to keep the edges on both sides of the membrane to exactly the same diameter. In order to avoid this drawback and to achieve at least approximately constant characteristics a very thin membrane would have to be provided, which would not, however, have an adequate rigidity for the measurement of high pressures.

It has also been suggested already to separate the transfer of force from the requirement of positive sealing. In that case the force is transferred by rigid ring segments inserted in the annular clearance and supported by cutting edges of the casing and of the head, whereas a usually corrugated membrane resting on said segments is used as a sealing. However, experience goes to show that this arrangement will not normally provide adequate sealing. Difficulties are encountered when measuring underpressures due to the fact that if the membrane has not been sufficiently pre-arched or if the pre-arching diminishes in operation, the membrane will be lifted off the segments. Moreover, the annular segments deprive the membrane of direct cooling by a coolant. As a result, it is liable to damage by heat when hot media are measured and there is a risk for the membrane to break in the area of the slots between the annular segments. Another disadvantage resides in the complicated design and high production costs of this type.

It is the object of the invention to provide a piezoelectric gauge of rugged construction and easy to produce, meeting the requirements of users with regard to the sealing of the annular clearance in connection with the transfer of force between the casing and the head, thus ensuring permanently constant characteristics.

According to the invention the membrane is of arched design over the entire width of the annular clearance, as of the shape of a torus, the surface on the inside of the arch in the areas directly adjoining the casing and the head extending approximately in the direction of the axis of the head, being preferably cylindrical. As a result of this design, the bending stresses of the membrane during the relative motion between the casing and the head are substantially diminished and it is therefore possible to use a membrane with a thinner and consequently more flexible arched member even in such cases where the latter is subject to a high pressure. In such areas of the membrane as extend in the direction of the axis of the head, tensile stresses only are liable to prevail. Consequently, the bending forces transmitted in the direction of the axis of the head are considerably less than those prevailing in conventional types and quite negligible even in the presence of hot gases and high pressures, so that the gauge will provide constantly uniform characteristics over the entire measuring range.

According to a further embodiment of the invention the edges of the bearing areas of the casing and the head located on the outside of the membrane arch may be rounded off, the membrane fitting snugly in these rounded-off areas. This will preclude damage to the membrane in these places, for example by shearing. On the other hand, in order to obtain a clearly defined pressure-loaded surface of the membrane, such sections of the surface of the membrane located on the inside of the arch as extend approximately in the direction of the axis of the head may, according to the invention, present sharp peripheral edges.

According to a preferred embodiment of the invention the arch of the membrane presents an annular cross-section at least in its central part, the center of curvature of said cross-section being displaced in the direction of the arch and being preferably located in the plane of the contact points provided for the membrane on the casing and on the head. This embodiment of the invention is simple to produce, the membrane not being subject to objectional stresses yet presenting considerable solidity even if made of thin-walled materials.

According to another embodiment of the invention the membrane may be thinner in the arched portion than in the areas adjoining the casing and the head. This design offers certain advantages for the manufacture of the arched portion of the membrane and for the sealing and attachment of the latter to the casing and the head of the gauge.

Finally, according to further embodiment of the invention, the membrane attached to the casing and the head by means of two coaxial rings which are for example pressed in or shrunk onto the casing and the head, respectively, can be positively locked together with said rings such as by welding, or preferably produced integral with said rings. This offers the advantage of a positive hold of the membrane, dependable sealing of the annular clearance and improved heat conduction from the arch of the membrane to the coaxially arranged rings and from there to the casing and/or the head.

Figure 2:
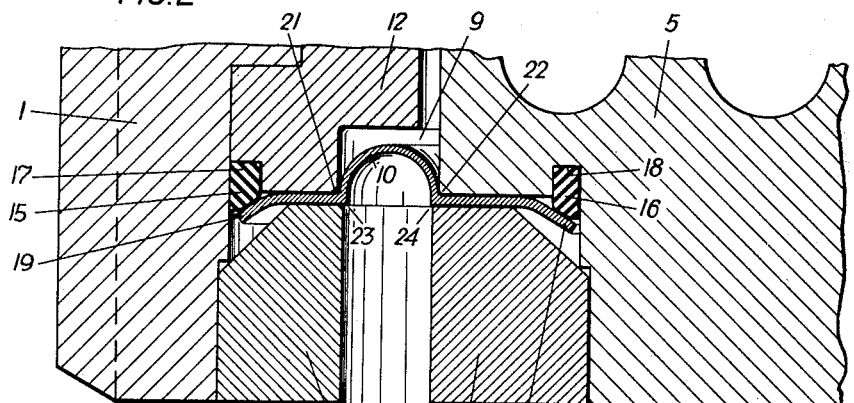
Figure 3:
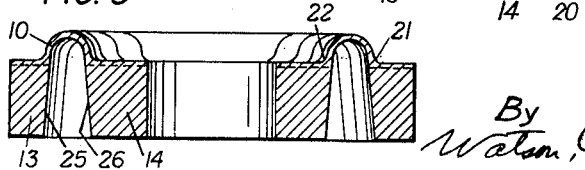

The invention is more fully explained by the following description of an embodiment of the invention with reference to the accompanying drawing in which:

FIG. 1 is a cross-sectional view of the part of the gauge containing the piezoelements, FIG. 2 is an enlarged cross-section of a detail thereof, and FIG. 3 is a cross-section of a detail of another embodiment of the invention.

Clamped down inside the cylindrical casing 1 of the gauge is a sleeve 2 enclosing and prestressing the piezoelements, such as for example, two quartz crystals 3 and 4, and terminated by a head 5 transmitting the pressure to be measured. The electric charge is taken up through electrodes 6 and 7, electrode 6 having an insulated conductor 8 whereas the second electrode 7 is conductively connected to the casing 1 via the sleeve 2. Around the portion of the sleeve 2 enclosing the quartz crystals 3 and 4 an annular clearance 9 is provided between said sleeve and the casing 1, said annular clearance being closed at the head end by a sealing membrane 10 located between the casing 1 and the head 5. The annular clearance 9 is traversed by a coolant admitted and discharged respectively through ducts provided in the casing 1, of which duct 11 only is shown in FIG. 1. For the purpose of improving the coolant circulation a sleeve 12 is provided in the annular clearance 9 and inserted in the casing 1, the membrane 10 resting on the pressure end face of said sleeve.

Two coaxial rings 13 and 14 are provided for the attachment of the membrane 10 to the casing 1 via sleeve 12 and to the head 5 respectively said rings being preferably pressed in or shrunk on to the sleeve 12 and to the head 5 respectively, and pressing the membrane 10 against bearing surfaces of the sleeve 12 and of the head 5. As can be seen in particular from FIGURE 2, the membrane 10 is sealed by means of elastic gasket rings 15 and 16, each of which is located in one of the annular grooves 17 and 18 respectively recessed in the sleeve 12 and in the head 5 and protruding from the bearing surfaces in the direction of the axis of the head 5. The rings 13 and 14 being chamfered in the area of the sealing rings 15 and 16, the rims 19 and 20 of the membrane 10 can be elastically deformed and adhere flexible to the sealing rings 15 and 16.

The membrane 10 is arched over the entire width of the annular clearance 9. In the central portion the arch presents an annular cross-section whose center of curvature is displaced in the direction of the arch and situated approximately in the plane of the contact points provided for the membrane 10 on the sleeve 12 and on the head 5. In its areas directly adjoining the sleeve 12 and the head 5 on both sides of the annular cross-section the surface of the membrane 10 located on the inside of the arch extends approximately in the direction of the axis of the head 10 and is of cylindrical shape. In addition, the membrane is thinner in its arched section than in the sections adjoining the sleeve 12 and the head 5. As a result of this design of the membrane 10 the arched portion of the membrane 10 is subject to minor bending stresses only during the relative motion between the casing 1 and the head 5, as a result of which any transfer of force altering the characteristics of the gauge is avoided to a considerable extent.

The edges 21 and 22 of the surfaces of the membrane 10 located on the outside of the arch of the membrane on both sides of the annular clearance 9 resting on the sleeve 12 and the head 5 are rounded off and the membrane 10 abuts snugly against these curvatures. Thus damage to the membrane 10, for example by shearing during the operation, will be avoided. The cylindrical sections of the surface located on the inside of the arch extending approximately in the direction of the axis of head 5, however, present sharp peripheral edges 23 and 24 in order to assure a clearly defined pressure-loaded surface of the membrane 10.

Within the scope of the invention the membrane 10 may, however, also be positively locked together with the rings 13 and 14, such as for example by welding or it may be produced integral with the latter. If the rings 13 and 14 are pressed in or shrunk on to the casing and to the head respectively, this embodiment may under certain circumstances make it possible to dispense with a special sealing of the membrane and/or the rings 13 and 14 against the casing 1 and the head 5. In the embodiment shown in FIG. 3 the membrane 10 is integral with the rings 13 and 14. Transistion from the concave boundary surface of the arcuate portion of the membrane 10 to the slightly conical surfaces 25 and 26 of the rings 13 and 14 facing each other in the area of the ring slot, is progressive and gradual. If pressed or shrunk-on rings 13 and 14 are used, it may under certain circumstances not be necessary for the rings 13 and 14 to be sealed off against the casing 1 and the head 5.

Within the scope of the invention it is also possible to positively connect the membrane 10 with the rings 13 and 14 also in a different manner such as by welding.

We claim:

1. A piezoelectric pressure transducer, particularly for measuring pressure variations in the cylinders of internal combustion engines, comprising a casing, piezoelements in said casing, a head in said casing for transmitting pressure to the said piezoelements, said casing and head having a ring slot formed between the casing and the head, a membrane closing said ring slot and forming a torus over the entire width of said ring slot, said torus presenting an annular cross-section at least in its central portion with a center of said cross-section being located approximately in a seating of the membrane on the casing and the head, the said membrane being ring-shaped forming a central perforation with outer and inner peripheral contact surfaces and positively clamped with its contact surfaces in the casing and the head, the front surface of the head being outwardly exposed at least in the area of the central perforation of the membrane.

2. A piezoelectric pressure transducer according to claim 1, in which the membrane has a smaller wall thickness in the area of its torus than its parts clamped in the casing and head, and in which a boundary surface of the torus is concave and ends in the areas directly adjoining the casing and the head in the direction of the axis of said head.

3. A piezoelectric pressure transducer according to claim 1, in which the membrane has a smaller wall thickness in the area of its torus than its parts clamped in the casing and head, and in which a boundary surface of the torus is concave and ends in the areas directly adjoining the casing and the head in the direction of the axis of said head, the portions of the concave contact surface ending in the direction of the axis of the head having sharp edges.

4. A piezoelectric pressure transducer according to claim 1, in which a pair of coaxial rings are provided one in the casing and the other in the head, the membrane being attached to the casing and to the head by means of the two rings and the membrane being positively connected with the rings.

5. A piezoelectric pressure transducer particularly for measuring pressure variations in cylinders of internal combustion engines comprising a casing, piezoelements in said casing, a head in said casing for transmitting pressure to said piezoelements, said casing and head having a ring slot formed therebetween, a membrane closing said ring slot and forming a torus over the entire width of said ring slot, said membrane being ring-shaped forming a central perforation through which the head projects outwardly exposed and extending beyond the membrane, and two coaxial rings in the casing spaced from each other to form a perforation for the torus of the membrane and being intergal with the membrane so that the membrane and the two rings form an integral structure.

References Cited in the file of this patent
UNITED STATES PATENTS

| | | |
|---|---|---|
| 2,846,496 | Baumgartner et al. | Aug. 5, 1958 |
| 3,006,192 | Li | Oct. 31, 1961 |
| 3,006,193 | Li | Oct. 31, 1961 |
| 3,024,649 | Taber | Mar. 13, 1962 |